US012604053B1

(12) United States Patent
Chen

(10) Patent No.: US 12,604,053 B1
(45) Date of Patent: Apr. 14, 2026

(54) METHOD FOR OUTPUTTING MEDIA CONTENT IN LIVE INTERACTION, ELECTRONIC DEVICE, AND PROGRAM PRODUCT

(71) Applicant: UC GLOBAL TRADE INC., Chino, CA (US)

(72) Inventor: Junjun Chen, Chino, CA (US)

(73) Assignee: UC GLOBAL TRADE INC., Chino, CA (US)

( * ) Notice: Subject to any disclaimer, the term of this patent is extended or adjusted under 35 U.S.C. 154(b) by 0 days.

(21) Appl. No.: 19/419,211

(22) Filed: Dec. 15, 2025

(51) Int. Cl.
| | |
|---|---|
| *H04N 21/266* | (2011.01) |
| *G06V 20/40* | (2022.01) |
| *G06V 40/16* | (2022.01) |
| *G06V 40/20* | (2022.01) |
| *G10L 15/25* | (2013.01) |
| *G10L 25/63* | (2013.01) |
| *H04N 21/2187* | (2011.01) |
| *H04N 21/442* | (2011.01) |

(52) U.S. Cl.
CPC ........... H04N 21/266 (2013.01); G06V 20/41 (2022.01); G06V 40/176 (2022.01); G06V 40/20 (2022.01); G10L 15/25 (2013.01); G10L 25/63 (2013.01); H04N 21/2187 (2013.01); H04N 21/44213 (2013.01)

(58) Field of Classification Search
CPC ............. H04N 21/266; H04N 21/2187; H04N 21/44213; G06V 20/41; G06V 40/176; G06V 40/20; G10L 15/25; G10L 25/63
See application file for complete search history.

(56) References Cited

U.S. PATENT DOCUMENTS

| | | | |
|---|---|---|---|
| 12,532,049 B1 * | 1/2026 | Qiu .................... | H04N 21/4784 |
| 2024/0121449 A1 * | 4/2024 | Takeda ............... | H04N 21/2187 |
| 2024/0315918 A1 * | 9/2024 | Liu ......................... | A41F 1/002 |
| 2025/0281348 A1 * | 9/2025 | Presti ..................... | A61H 19/34 |
| 2026/0006264 A1 * | 1/2026 | Liu ......................... | A61H 19/00 |

FOREIGN PATENT DOCUMENTS

CN          108282535 A          7/2018

* cited by examiner

*Primary Examiner* — Oschta I Montoya
(74) *Attorney, Agent, or Firm* — FIDELI LAW PLLC; Qiang Li

(57) ABSTRACT

The present application relates to the field of multimedia technologies, and proposes a method for outputting media content in live interaction, an electronic device, and a computer program product. The method includes: in a process in which a streamer performs live streaming by using a target product, obtaining live streaming feature information used to determine media content to be output; determining target media content based on the live streaming feature information; and outputting the target media content. In this method, when watching live streams, a viewer not only obtains regular live streaming information of the streamer, but also can receive additional target media content. With the target media content, the viewer can more intuitively perceive experience of using the target product by the streamer, thereby significantly improving the sense of novelty and immersion of the viewer while watching live streams, to improve viewership of live streams and boost product sales.

17 Claims, 2 Drawing Sheets

METHOD FOR OUTPUTTING MEDIA CONTENT IN LIVE INTERACTION, ELECTRONIC DEVICE, AND PROGRAM PRODUCT

TECHNICAL FIELD

The present application relates to the field of multimedia technologies, and in particular, to a method for outputting media content in live interaction, an electronic device, and a computer program product.

BACKGROUND

In the course of implementing the present disclosure, at least the following problem has been identified: With the rapid development of the live streaming industry, live streaming content gradually covers a plurality of fields, including entertainment, education, product introduction, and the like. In a process in which a streamer introduces a product in live streaming, the sense of novelty and immersion are important factors that attract viewers. However, as viewers watch such live streams more frequently, their sense of novelty and sense of immersion gradually diminish, eventually leading to a significant decline in viewership of live streams, which in turn affects product sales.

SUMMARY

In view of this, embodiments of the present application provide a method for outputting media content in live interaction, an electronic device, and a computer program product, so that the sense of novelty and immersion of a viewer while watching live streams can be improved, thereby improving viewership of live streams and boosting product sales.

A first aspect of the embodiments of the present application provides a method for outputting media content in live interaction, including:

in a process in which a streamer performs live streaming by using a target product, obtaining live streaming feature information used to determine media content to be output;

determining target media content based on the live streaming feature information; and outputting the target media content.

For the technical solution in the embodiments of the present application, in the process in which the streamer performs live streaming by using the target product, the streamer obtains, by using an electronic device such as a mobile phone, the live streaming feature information used to determine the media content to be output, then determines the target media content based on the live streaming feature information, and finally outputs the target media content in a specified manner. For example, it is assumed that when the streamer performs live streaming by using a cervical massager, the mobile phone may be used to capture a facial image of the streamer and recognize a facial expression feature. The facial expression feature may be used as the live streaming feature information that determines the media content to be output. Then, corresponding target media content is generated based on the facial expression feature. For example, audio and/or text "The intensity feels very comfortable" is generated based on an expression indicating relax, and audio and/or text "The intensity is too strong" is generated based on an expression indicating pain. Finally, the generated audio can be played and/or the generated text can be displayed in the live streaming process. With this setting, when watching live streams, a viewer not only obtains regular live streaming information of the streamer, but also can receive additional target media content. By using the target media content, the viewer can more intuitively perceive experience of using the target product by the streamer, thereby significantly improving the sense of novelty and immersion of the viewer while watching live streams, to improve viewership of live streams and boost product sales.

In an implementation of the embodiments of the present application, the obtaining live streaming feature information used to determine media content to be output includes:

obtaining a real-time facial image of the streamer;

recognizing a facial expression feature of the streamer based on the real-time facial image; and determining the facial expression feature as the live streaming feature information.

In an implementation of the embodiments of the present application, the obtaining live streaming feature information used to determine media content to be output includes:

obtaining a real-time voice signal of the streamer;

recognizing an audio emotion feature of the streamer based on the real-time voice signal; and determining the audio emotion feature as the live streaming feature information.

In an implementation of the embodiments of the present application, the obtaining live streaming feature information used to determine media content to be output includes:

detecting an operation action of the streamer;

recognizing a trigger command and/or an emotion cue of the streamer based on the operation action; and determining the trigger command and/or the emotion cue as the live streaming feature information.

In an implementation of the embodiments of the present application, the obtaining live streaming feature information used to determine media content to be output includes:

obtaining a physiological status signal of the streamer;

recognizing an emotional state of the streamer based on the physiological status signal; and determining the emotional state as the live streaming feature information.

In an implementation of the embodiments of the present application, the obtaining live streaming feature information used to determine media content to be output includes:

obtaining text content involved in the live streaming process;

determining a text emotion feature based on the text content; and determining the text emotion feature as the live streaming feature information.

In an implementation of the embodiments of the present application, the obtaining live streaming feature information used to determine media content to be output includes:

obtaining a real-time lip-shape image of the streamer;

performing visual speech recognition on the real-time lip-shape image to determine an intended-to-speak text of the streamer; and determining the intended-to-speak text as the live streaming feature information.

In an implementation of the embodiments of the present application, the obtaining live streaming feature information used to determine media content to be output includes:

obtaining real-time feedback information provided by a viewer for the streamer; and determining the real-time feedback information as the live streaming feature information.

3

In an implementation of the embodiments of the present application, the obtaining live streaming feature information used to determine media content to be output includes:

obtaining a modality signal of the streamer, where the modality signal includes at least one of a real-time facial image, a real-time voice signal, a text input signal, or a gesture signal; and determining the modality signal as the live streaming feature information.

In an implementation of the embodiments of the present application, the obtaining live streaming feature information used to determine media content to be output includes:

recognizing environment feature information of an environment in which the streamer is located; and determining the environment feature information as the live streaming feature information.

In an implementation of the embodiments of the present application, the determining target media content based on the live streaming feature information includes:

synthesizing the target media content based on the live streaming feature information in a preset media content synthesis manner.

In an implementation of the embodiments of the present application, the synthesizing the target media content based on the live streaming feature information in a preset media content synthesis manner includes:

synthesizing target voice as the target media content based on the live streaming feature information in a preset voice synthesis manner; or synthesizing target music as the target media content based on the live streaming feature information in a preset music synthesis manner; or synthesizing a target animation as the target media content based on the live streaming feature information in a preset animation synthesis manner; or synthesizing target image as the target media content based on the live streaming feature information in a preset image synthesis manner.

In an implementation of the embodiments of the present application, after the outputting the target media content, the method further includes:

determining a trend of change in tipping information from a viewer toward the streamer; and adjusting the media content synthesis manner based on the trend of change.

In an implementation of the embodiments of the present application, the determining target media content based on the live streaming feature information includes:

searching a pre-created media content library for at least one media content associated with the live streaming feature information; and determining the at least one media content as the target media content.

In an implementation of the embodiments of the present application, the outputting the target media content includes:

outputting the target media content in the live streaming process; or outputting the target media content after the live streaming process ends or after a delay time period confirmed by the streamer.

In an implementation of the embodiments of the present application, the method further includes:

obtaining interaction data between the viewer and the streamer, where the interaction data includes at least one of tipping information, comment information, or liking information;

determining a quantity of participants corresponding to the interaction data, where the quantity of participants includes at least one of a quantity of viewers who tip, a quantity of viewers who post comments, or a quantity of viewers who give likes;

determining a corresponding weight allocation of the interaction data based on the quantity of participants; and controlling the target product based on the interaction data and the weight allocation of the interaction data.

In an implementation of the embodiments of the present application, the method further includes:

obtaining the tipping information from the viewer toward the streamer;

generating a target control parameter of the target product based on the tipping information; and controlling the target product based on the target control parameter.

In an implementation of the embodiments of the present application, the tipping information includes a tipping amount, and the generating a target control parameter of the target product based on the tipping information includes:

determining a target amount tier in which the tipping amount falls; and searching, based on a preset mapping relationship, for a control parameter corresponding to the target amount tier as the target control parameter, where the preset mapping relationship records a control parameter corresponding to each amount tier.

A second aspect of the embodiments of the present application provides an apparatus for outputting media content in live interaction, including:

a live streaming feature obtaining module, configured to: in a process in which a streamer performs live streaming by using a target product, obtain live streaming feature information used to determine media content to be output;

a media content determining module, configured to determine target media content based on the live streaming feature information; and a media content output module, configured to output the target media content.

A third aspect of the embodiments of the present application provides an electronic device. The electronic device includes a memory, a processor, and a computer program stored in the memory and capable of running on the processor, and when the processor executes the computer program, the method for outputting media content in live interaction provided in the first aspect of the embodiments of the present application is implemented.

A fourth aspect of the embodiments of the present application provides a computer program product. When the computer program product runs on an electronic device, the electronic device is enabled to perform the method for outputting media content in live interaction provided in the first aspect of the embodiments of the present application.

A fifth aspect of the embodiments of the present application provides a computer-readable storage medium. The computer-readable storage medium stores a computer program, and when the computer program is executed by a processor, the method for outputting media content in live interaction provided in the first aspect of the embodiments of the present application is implemented.

It may be understood that for beneficial effects of the second aspect to the fifth aspect, reference may be made to the related descriptions in the first aspect. Details are not described herein again.

DESCRIPTION OF EMBODIMENTS

In the following descriptions, for the purpose of description instead of limitation, specific details such as a specific system structure and a technology are proposed, to provide a thorough understanding of embodiments of the present application. However, persons skilled in the art should understand that the present application may also be implemented in other embodiments without these specific details. In other cases, detailed descriptions about a well-known system, apparatus, circuit, and method are omitted to prevent unnecessary details from obscuring the description of the present application. In addition, in the descriptions of this specification and the appended claims of the present application, the terms "first", "second", "third", and the like are merely used to distinguish between the descriptions, and cannot be understood as indicating or implying relative importance.

At present, the online live-streaming industry is developing rapidly. Streamers introduce products through live streaming, which on one hand allows them to receive tips from viewers, and on the other hand promotes online sales of the products. However, as a process in which the streamer introduces products is usually fixed, the sense of novelty and immersion of viewers is prone to diminish, eventually leading to a significant decline in viewership of live streams, which in turn affects product sales.

To resolve the foregoing technical problem, embodiments of the present application provide a method for outputting media content in live interaction, an electronic device, and a computer program product, which can enhance users' sense of novelty and sense of immersion while watching live streams, thereby improving viewership of live streams and boosting product sales. For more specific technical implementation details of the embodiments of the present application, refer to the following described method embodiments.

It should be understood that the method embodiments proposed in the present application may be performed by various electronic devices. For example, the electronic device may be a mobile phone, a tablet computer, a wearable electronic device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), a large-screen television, or the like. A specific type of the electronic device is not limited in the embodiments of the present application. In addition, the electronic device may be an electronic device used by a streamer (for example, a mobile phone or a tablet computer used by the streamer during live streaming), or may be an electronic device used by a viewer (for example, a mobile phone or a tablet computer used by the viewer when watching live streams), which is not limited in the embodiments of the present application either.

Figure 1:
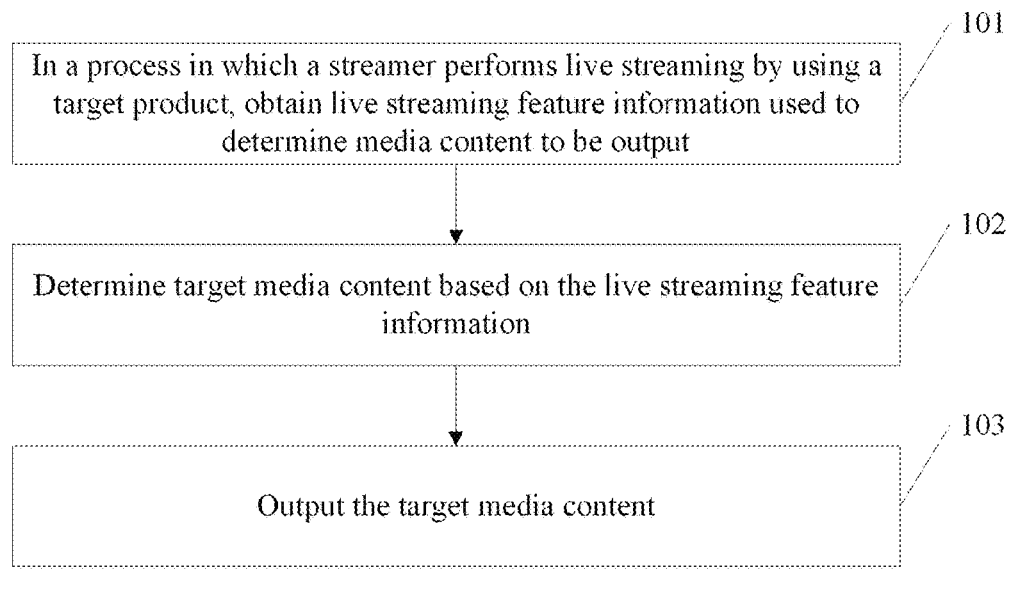
FIG. 1 is a flowchart of a method for outputting media content in live interaction according to embodiments of the present application.

FIG. 1 shows a method for outputting media content in live interaction according to embodiments of the present application, including:

101. In a process in which a streamer performs live streaming by using a target product, obtain live streaming feature information used to determine media content to be output.

The method embodiment may be performed by an electronic device used by the streamer or an electronic device used by a viewer. In the process in which the streamer performs live streaming by using the target product, the electronic device may be used to obtain the live streaming feature information used to determine the media content to be output, that is, different live streaming feature information may respectively correspond to different media content to be output. The target product used by the streamer may include but is not limited to massagers, electronic toys, smart small appliances, wearable devices, or adult novelty products, among others. The live streaming feature information may include but is not limited to: a facial expression feature of the streamer, an audio emotion feature of the streamer, a trigger command and/or an emotion cue of the streamer, an emotional state of the streamer, a text emotion feature of a live streaming room, an intended-to-speak text of the streamer, real-time feedback information provided by the viewer for the streamer, a multi-modality signal of the streamer, environment feature information of an environment in which the streamer is located, among others. Next, specific manners of obtaining the foregoing various live streaming feature information are separately described.

In an implementation of the embodiments of the present application, the obtaining live streaming feature information used to determine media content to be output includes:

(1) obtaining a real-time facial image of the streamer;

(2) recognizing a facial expression feature of the streamer based on the real-time facial image; and (3) determining the facial expression feature as the live streaming feature information.

When the streamer performs live streaming by using an electronic device, to better introduce the target product, the streamer may use the target product in person, and real feelings of using the target product are presented through a facial expression. The electronic device is used to shoot the real-time facial image of the streamer, and then the facial expression feature is extracted and recognized from the real-time facial image. Recognized facial expression features may include but are not limited to: excitement, happiness, surprise, sadness, anger, fear, shyness, disgust, relaxation, pain, helplessness, and the like. Currently, methods that can be used to recognize a facial expression feature based on a facial image mainly include a template-based matching method, a neural network-based method, a probability model-based method, a support vector machine-based method, and the like. After the facial expression feature of the streamer is obtained through recognition, the facial expression feature is determined as the live streaming feature information, which may be used to determine target media content to be output.

In an implementation of the embodiments of the present application, the obtaining live streaming feature information used to determine media content to be output includes:

(1) obtaining a real-time voice signal of the streamer;

(2) recognizing an audio emotion feature of the streamer based on the real-time voice signal; and (3) determining the audio emotion feature as the live streaming feature information.

When performing live streaming by using an electronic device, the streamer uses the target product in person and provides voice introductions. The electronic device may detect the real-time voice signal of the streamer, and then analyzes an audio feature of the real-time voice signal, so as to recognize the audio emotion feature of the streamer. For example, through analysis of features such as the volume, the tone, and the speech rate of the real-time voice signal, the audio emotion feature of the streamer may be recognized as: excitement, happiness, cheerfulness, lethargy, anger, fear, shyness, disgust, relaxation, pain, helplessness, or the like. After the audio emotion feature of the streamer is obtained through recognition, the audio emotion feature is determined as the live streaming feature information, which may be used to determine target media content to be output. In an implementation of the embodiments of the present application, the obtaining live streaming feature information used to determine media content to be output includes:

(1) detecting an operation action of the streamer;

(2) recognizing a trigger command and/or an emotion cue of the streamer based on the operation action; and (3) determining the trigger command and/or the emotion cue as the live streaming feature information.

When performing live streaming by using an electronic device, the streamer uses the target product in person. In this case, the electronic device may be used to detect the operation action of the streamer. For example, a gesture action of the streamer is detected by using an action capturing technology, or a touch action of the streamer is detected by using a touch screen or a control interface of the electronic device. Based on the detected operation action, the trigger command and/or the emotion cue of the streamer may be recognized. For example, a heart-shaped hand gesture may be mapped to an emotion cue indicating happiness, while a touch action such as tapping a "send red envelopes" button on a touchscreen may be mapped to a trigger instruction for an operation of sending a red envelope, and so on. After the trigger command and/or the emotion cue of the streamer are obtained through recognition, the trigger command and/or the emotion cue are determined as the live streaming feature information, which may be used to determine target media content to be output. In an implementation of the embodiments of the present application, the obtaining live streaming feature information used to determine media content to be output includes:

(1) obtaining a physiological status signal of the streamer;

(2) recognizing an emotional state of the streamer based on the physiological status signal; and (3) determining the emotional state as the live streaming feature information.

When performing live streaming by using an electronic device, the streamer uses the target product in person. In this case, a wearable device such as a smart band worn by the streamer may be used to detect a physiological status signal such as a heart rate and a galvanic skin response of the streamer, and send the detected physiological status signal to the electronic device. The emotional state of the streamer may be recognized based on the detected physiological status signal. For example, when a high heart rate is detected, it may be determined that the emotional state of the streamer is "excited"; when a steady heart rate is detected, it may be determined that the emotional state of the streamer is "calm"; and so on. After the emotional state of the streamer is obtained through recognition, the emotional state is determined as the live streaming feature information, which may be used to determine target media content to be output. In an implementation of the embodiments of the present application, the obtaining live streaming feature information used to determine media content to be output includes:

(1) obtaining text content involved in the live streaming process;

(2) determining a text emotion feature based on the text content; and (3) determining the text emotion feature as the live streaming feature information.

When performing live streaming by using an electronic device, the streamer uses the target product in person. In this case, the electronic device may be used to obtain text content involved in the live streaming process. The text content may include but is not limited to chat content in a live streaming room, subtitle content, voice-to-text content of the streamer, comment content of a viewer, and the like. Based on the text content, a corresponding text emotion feature may be determined, such as happiness, excitement, anger, fear, shyness, disgust, encouragement, pain, helplessness, or the like. After the corresponding text emotion feature is determined, the text emotion feature is determined as the live streaming feature information, which may be used to determine target media content to be output. In an implementation of the embodiments of the present application, the obtaining live streaming feature information used to determine media content to be output includes:

(1) obtaining a real-time lip-shape image of the streamer;

(2) performing visual speech recognition on the real-time lip-shape image to determine an intended-to-speak text of the streamer; and (3) determining the intended-to-speak text as the live streaming feature information.

When performing live streaming by using an electronic device, the streamer uses the target product in person and provides voice introductions. In this case, the electronic device may be used to shoot the real-time lip-shape image of the streamer. Visual speech recognition (lip-reading) processing is performed on the real-time lip-shape image, so that a text statement may be inferred based on a lip shape of the streamer, so as to determine the intended-to-speak text of the streamer, that is, text information that the streamer wants to express. After the intended-to-speak text of the streamer is determined, the intended-to-speak text is determined as the live streaming feature information, which may be used to determine target media content to be output. In an implementation of the embodiments of the present application, the obtaining live streaming feature information used to determine media content to be output includes:

(1) obtaining real-time feedback information provided by a viewer for the streamer; and (2) determining the real-time feedback information as the live streaming feature information.

When performing live streaming by using an electronic device of the streamer, the streamer uses the target product in person, and each viewer may also interact with the streamer by using an electronic device of the viewer, and output various types of real-time feedback information such as bullet comment information, expression information, voting information, tipping information, or liking information to the streamer. The real-time feedback information may be used to represent a reaction or an emotion cue of the viewer while watching live streams. After the real-time feedback information is obtained, the real-time feedback information is determined as the live streaming feature information, which may be used to determine target media content to be output. In an implementation of the embodiments of the present application, the obtaining live streaming feature information used to determine media content to be output includes:

(1) obtaining a modality signal of the streamer, where the modality signal includes at least one of a real-time facial image, a real-time voice signal, a text input signal, or a gesture signal; and (2) determining the modality signal as the live streaming feature information.

When performing live streaming by using an electronic device of the streamer, the streamer uses the target product in person. In this case, the electronic device may be used to capture various modality signals of the streamer, for example, at least one of a real-time facial image, a real-time voice signal, a text input signal, or a gesture signal. A plurality of modality signals may be combined to form the live streaming feature information, which can represent current emotion of the streamer and may be used to determine target media content to be output.

In an implementation of the embodiments of the present application, the obtaining live streaming feature information used to determine media content to be output includes:

(1) recognizing environment feature information of an environment in which the streamer is located; and (2) determining the environment feature information as the live streaming feature information.

When performing live streaming by using an electronic device of the streamer, the streamer uses the target product in person. In this case, the electronic device may be used to recognize the environment feature information of the environment in which the streamer is located, such as ambient brightness, ambient light, ambient temperature, ambient humidity, or background noise. The environment feature information may be captured by a corresponding sensor and sent to the electronic device. After the environment feature information is obtained, the environment feature information is determined as the live streaming feature information, which may be used to determine target media content to be output.

102. Determine target media content based on the live streaming feature information.

After the live streaming feature information described above is obtained, the corresponding target media content may be determined based on the live streaming feature information. Specifically, the electronic device may pre-store a mapping relationship between various pieces of live streaming feature information and various media content. After determining current live streaming feature information, the electronic device may search for stored corresponding media content as the target media content based on the mapping relationship, or may directly obtain required target media content through synthesis based on the mapping relationship.

In an implementation of the embodiments of the present application, the determining target media content based on the live streaming feature information includes:

synthesizing the target media content based on the live streaming feature information in a preset media content synthesis manner.

An operation manner for determining the target media content based on the live streaming feature information is: synthesizing corresponding media content as the target media content based on the live streaming feature information in the preset media content synthesis manner. The synthesized target media content may be media data in various formats such as text, emoji, image, animation, video, voice, or music. In a general case, the synthesized target media content may be used to reflect a current emotional feature or product experience feelings of the streamer. In an implementation of the embodiments of the present application, the synthesizing the target media content based on the live streaming feature information in a preset media content synthesis manner includes:

synthesizing target voice as the target media content based on the live streaming feature information in a preset voice synthesis manner; or synthesizing target music as the target media content based on the live streaming feature information in a preset music synthesis manner; or synthesizing a target animation as the target media content based on the live streaming feature information in a preset animation synthesis manner; or synthesizing target image as the target media content based on the live streaming feature information in a preset image synthesis manner.

Specifically, if voice needs to be synthesized, corresponding target voice is synthesized as the target media content based on the live streaming feature information in the preset voice synthesis manner. If music needs to be synthesized, corresponding target music is synthesized as the target media content based on the live streaming feature information in the preset music synthesis manner. If an animation needs to be synthesized, a corresponding target animation is synthesized as the target media content based on the live streaming feature information in the preset animation synthesis manner. If an image needs to be synthesized, a corresponding target image is synthesized as the target media content based on the live streaming feature information in the preset image synthesis manner. The target voice, the target music, the target animation, and the target image that are obtained through synthesis are all determined based on the live streaming feature information, and may be used to represent a current emotion feature or product experience feelings of the streamer.

In an implementation of the embodiments of the present application, the determining target media content based on the live streaming feature information includes:

(1) searching a pre-created media content library for at least one media content associated with live streaming feature information; and (2) determining the at least one media content as the target media content.

Another operation manner for determining the target media content based on the live streaming feature information is: pre-creating a media content library, which stores a large quantity of media content associated with different types of live streaming feature information. Data formats of the media content may include text, emoji, image, animation, video, voice, music, and the like. After current live streaming feature information is determined, the media content library is searched for at least one media content associated with the live streaming feature information, and the at least one media content is used as the target media content. The at least one media content selected herein is associated with the current live streaming feature information, and may also be used to represent a current emotion feature or product experience feelings of the streamer.

To help understand how to specifically determine the target media content based on the live streaming feature information, the facial expression feature of the streamer being used as the live streaming feature information and the target voice being used as the target media content are used as an example to describe a specific technology implementation means.

After the facial expression feature of the streamer is obtained through recognition, the target voice may be synthesized based on the facial expression feature in the preset voice synthesis manner. Specifically, the electronic device may pre-store a voice feature and voice content that are respectively corresponding to each facial expression feature. The voice feature includes volume, tone, speech rate, sound quality, audio, and the like. The voice content refers to specific information to be expressed through voice. By searching for a voice feature and voice content that are corresponding to a current facial expression feature of the streamer, target voice having a corresponding voice feature and corresponding voice content may be generated by using a voice synthesis engine. For example, if it is assumed that the recognized facial expression feature of the streamer indicates excitement, a voice feature 1 and voice content 1 that are corresponding to an excited expression are determined, and target voice having the voice feature 1 and the voice content 1 is synthesized; if it is assumed that the recognized facial expression feature of the streamer indicates pain, a voice feature 2 and voice content 2 that are corresponding to a painful expression are determined, and target voice having the voice feature 2 and the voice content 2 is synthesized; and so on.

In an implementation of the embodiments of the present application, the synthesizing target voice based on the facial expression feature includes:

(1) obtaining live streaming voice of the streamer;

(2) extracting a first voice feature of the streamer based on the live streaming voice; and (3) synthesizing target voice based on the first voice feature and the facial expression feature.

To enable the synthesized target voice to have a voice feature similar to that of the streamer, the electronic device may be used to capture the live streaming voice of the streamer, that is, a voice signal used by the streamer to speak in the live streaming process. Through voice feature analysis on the live streaming voice, features such as volume, tone, speech rate, sound quality, and audio that are corresponding to the live streaming voice may be determined and recorded as the first voice feature. Then, corresponding target voice is synthesized based on the first voice feature and the facial expression feature. In this way, the synthesized target voice has a voice feature similar to that of the streamer, and the voice content is determined based on the facial expression feature.

In an implementation of the embodiments of the present application, the synthesizing target voice based on the first voice feature and the facial expression feature includes:

(1) determining first voice content based on the facial expression feature; and (2) synthesizing the target voice based on the first voice feature and the first voice content.

Voice content corresponding to a current facial expression feature of the streamer is found, and the voice content is recorded as the first voice content, and then target voice having the first voice feature and the first voice content is generated by using a voice synthesis engine. For example, if it is assumed that the streamer is a female with a brisk speaking pace, a current facial expression feature of the streamer indicates happiness, and voice content corresponding to happiness is "I am so happy today", the synthesized target voice is a brisk female voice saying "I'm so happy today." With this setting, target voice that matches both a voice feature and a facial expression of the streamer can be generated, so that the sense of immersion of the viewer while watching live streams can be improved more effectively.

As an example, the target product is a cervical massager. If a facial expression feature of the streamer indicates pain, voice content with a heavy tone such as "The massager's intensity is too strong—it really hurts" may be synthesized as the target voice.

As another example, the target product is an electric toy car. If a facial expression feature of the streamer indicates happiness, voice content with a cheerful tone such as "The car is so fast—this is so much fun!" may be synthesized as the target voice.

As yet another example, the target product is an adult novelty product. If a facial expression feature of the streamer indicates excitement, voice content with a rapid-paced tone such as "This product is amazing" may be synthesized as the target voice.

The target product used by the streamer in the live streaming process is usually manually controlled by the streamer, and cannot be linked with behavior of the viewer, which reduces the level of interactive entertainment for the viewer. To resolve this problem, the embodiments of the present application propose an operation manner of controlling the target product based on tipping behavior of a viewer, which can effectively improve the level of interactive entertainment for the viewer. For specific technical implementation details, refer to the following descriptions.

In an implementation of the embodiments of the present application, the method further includes:

obtaining interaction data between the viewer and the streamer, where the interaction data includes at least one of tipping information, comment information, or liking information;

determining a quantity of participants corresponding to the interaction data, where the quantity of participants includes at least one of a quantity of viewers who tip, a quantity of viewers who post comments, or a quantity of viewers who give likes;

determining a corresponding weight allocation of the interaction data based on the quantity of participants; and controlling the target product based on the interaction data and the weight allocation of the interaction data.

First, interaction data between the viewer and the streamer in the live streaming room or an online interactive platform may be obtained, and the interaction data may include but is not limited to at least one of tipping information, comment information, or liking information. Then, a quantity of participants corresponding to the interaction data is counted, and correspondingly, the quantity of participants includes at least one of a quantity of viewers who tip corresponding to the tipping information, a quantity of viewers who post comments corresponding to the tipping information, and a quantity of viewers who give likes corresponding to the tipping information. Then, corresponding weight allocations of the interaction data are separately determined based on these participants. It may be understood that a higher quantity of participants of a specific type indicates a higher corresponding weight of the interaction data. For example, if it is assumed that the quantity of viewers who tip is 50, the quantity of viewers who post comments is 100, and the quantity of viewers who give likes is 50, it may be determined that a weight of the tipping information is 25%, a weight of the comment information is 50%, and a weight of the liking information is 25%. Finally, the target product is correspondingly controlled based on various interaction data and weight allocations thereof. Specifically, a mapping relationship table that is used to describe a correspondence between interaction data, a weight allocation, and a control parameter of the target product may be created and stored in advance. After obtaining the interaction data of the viewer by using a live broadcasting platform and determining a weight allocation of the interaction data, the electronic device used by the streamer may search the mapping relationship table for a corresponding control parameter of the target product based on current interaction data and a weight allocation of the interaction data. The electronic device may establish a communication connection to the target product in a manner such as Bluetooth or Wi-Fi, and send the control parameter to the target product, so that the target product performs an action based on the control parameter. In the foregoing process, the control parameter of the target product can be automatically adjusted based on the interaction data between the viewer and the streamer and the weight allocation of the interaction data, so as to determine a status of using the target product by the streamer. After the status of using the target product changes, the live streaming feature information such as the facial expression feature of the streamer also changes correspondingly, and further, the output target media content also changes correspondingly. Finally, this enables a linked output of media content and product control determined based on the interaction data and the quantity of participants, thereby significantly enhancing the level of interactive entertainment and sense of immersion of the viewer while watching live streams.

In an implementation of the embodiments of the present application, the method further includes:

(1) obtaining the tipping information from the viewer toward the streamer;

(2) generating a target control parameter of the target product based on the tipping information; and (3) controlling target product based on the target control parameter.

First, tipping information from the viewer toward the streamer on a live streaming platform or an online interaction platform is obtained, and may include information such as a user identity, a tipping amount, a tipping frequency, a quantity of tipping times, and tipping time. Then, a current control parameter of the target product is generated based on the tipping information, and is recorded as the target control parameter. Finally, the target product is controlled based on the target control parameter. Specifically, after obtaining the tipping information of the viewer through the live streaming platform, the electronic device used by the streamer may generate, based on a preset mapping relationship, the target control parameter corresponding to the tipping information. Different tipping information may correspond to different target control parameters. The electronic device may establish a communication connection to the target product in a manner such as Bluetooth or Wi-Fi, and send the target control parameter to the target product, so that the target product performs an action based on the target control parameter. In the foregoing process, the control parameter of the target product is automatically adjusted based on online tipping behavior of the viewer, and combined with played target voice, a linked output of audio and product control determined by the tipping behavior can be enabled, thereby significantly enhancing the level of interactive entertainment and sense of immersion of the viewer while watching live streams.

In an implementation of the embodiments of the present application, the tipping information includes a tipping amount, and the generating a target control parameter of the target product based on the tipping information includes:

(1) determining a target amount tier in which the tipping amount falls; and (2) searching, based on a preset mapping relationship, for a control parameter corresponding to the target amount tier as the target control parameter, where the preset mapping relationship records a control parameter corresponding to each amount tier.

The preset mapping relationship stored by the electronic device may record control parameters respectively corresponding to a plurality of different amount tiers. For example, an amount tier 1 (1 to 100 tokens) corresponds to a control parameter 1, an amount tier 2 (101 to 500 tokens) corresponds to a control parameter 2, an amount tier 3 (501 to 2000 tokens) corresponds to a control parameter 3, and an amount tier 4 (above 2000 tokens) corresponds to a control parameter 4. After the tipping amount included in the tipping information is obtained, the target amount tier in which the tipping amount falls is first determined, and then the control parameter corresponding to the target amount tier is found as the target control parameter by using the preset mapping relationship. For the foregoing example, it is assumed that a current tipping amount is 200 tokens, the target amount tier is the amount tier 2, and because the amount tier 2 corresponds to the control parameter 2, the target control parameter is the control parameter 2; and so on. In addition, the streamer may manually modify the foregoing preset mapping relationship based on an actual requirement. The tipping amount may include at least one of a token, a virtual currency (not illustrated), a virtual gift, a red envelope, a link, a wallet address, or a dynamic effect.

As an example, the target product is a cervical massager, and the control parameter of the target product includes massage pressure and motion frequency. A mobile phone of the streamer may be connected to the cervical massager through Bluetooth or Wi-Fi. When the user's tipping amount is low, the mobile phone controls the cervical massager to operate at low massage pressure and motion frequency; and when the user's tipping amount is high, the mobile phone controls the cervical massager to operate at high massage pressure and motion frequency.

As another example, the target product is an electric toy car, and the control parameter of the target product includes a driving speed and a steering amplitude. A mobile phone of the streamer may be connected to the electric toy car through Bluetooth or Wi-Fi. When the user's tipping amount is low, the mobile phone controls the electric toy car to move straight at a slow speed; and when the user's tipping amount is high, the mobile phone controls the electric toy car to move at a high speed and make sharp turns.

As still another example, the target product is an adult novelty product, and the control parameter of the target product includes vibration strength and vibration frequency. A mobile phone of the streamer may be connected to the adult novelty product through Bluetooth or Wi-Fi. When the user's tipping amount is low, the mobile phone controls the adult novelty product to vibrate based on low vibration intensity and vibration frequency; and when the user's tipping amount is high, the mobile phone controls the adult novelty product to vibrate based on vibration intensity and vibration frequency.

It can be learned from the foregoing several examples that the tipping behavior of the viewer can control the target product on a live streaming screen. In addition, after the tipping behavior triggers a change in the control parameter of the target product, the feeling and a facial expression of the streamer also change correspondingly, thereby triggering a change in the target media content. In this way, the level of interactive entertainment of the viewer can be effectively enhanced, and tipping enthusiasm of the viewer is activated.

Both the tipping information of the viewer and the foregoing target control parameter may be used to synthesize the target voice. For specific technical implementation details, refer to the following description.

In an implementation of the embodiments of the present application, the synthesizing target voice based on the facial expression feature includes:

(1) determining second voice content based on the facial expression feature;

(2) determining a second voice feature based on the target control parameter; and (3) synthesizing the target voice based on the second voice feature and the second voice content.

With reference to the foregoing descriptions, corresponding voice content may be obtained based on the facial expression feature of the streamer, and the voice content is denoted herein as the second voice content. The target control parameter of the target product may be used to determine a voice feature of the target voice, and the voice feature is denoted herein as the second voice feature. Finally, the target voice having the second voice feature and the second voice content is generated by using a voice synthesis engine. With this setting, target voice with a voice feature adapting to the target control parameter of the target product can be generated. For example, the volume of the target voice is proportional to vibration strength, a speech rate of the target voice is proportional to vibration frequency, and the like. In this way, scenario integration of the target voice can be further enhanced, and the sense of immersion of the viewer while watching live streams can be improved.

In another implementation of the embodiments of the present application, the synthesizing target voice based on the facial expression feature includes:

(1) determining third voice content based on the tipping information;

(2) determining third voice feature based on the facial expression feature; and (3) synthesizing target voice based on the third voice feature and the third voice content.

The tipping information of the viewer may be used to determine voice content of the target voice, and the voice content is denoted herein as the third voice content. For example, a low tipping amount corresponds to common short voice content, a high tipping amount corresponds to customized special voice content, and so on. The facial expression feature of the streamer may also be used to determine a voice feature of the target voice, and the voice feature is denoted herein as the third voice feature. For example, a facial expression indicating happiness corresponds to a voice feature indicating briskness, a facial expression indicating sadness corresponds to a voice feature indicating heaviness, and so on. Finally, target voice having the third voice feature and the third voice content is generated by using a voice synthesis engine. With this setting, target voice with a voice feature adapting to the facial expression of the streamer and with voice content matching the tipping amount can be generated, thereby further improving the sense of immersion and the level of interactive entertainment of the viewer while watching live streams.

In addition, the target control parameter of the target product may also be used to determine voice content of the target voice. For example, a high vibration strength tier corresponds to voice content "Thanks for your support, the high-intensity mode has been activated". The tipping information of the viewer may also be used to determine a voice feature of the target voice. For example, the volume of the target voice is proportional to the tipping amount, a speech rate of the target voice is proportional to the tipping amount, and so on. It may be learned that, in the embodiments of the present application, a plurality of different voice synthesis manners are proposed. Through combination of at least one of a plurality of different factors such as the facial expression of the streamer, the voice feature of the streamer, the tipping information of the streamer, and the product control parameter, extremely rich and colorful target voice can be generated.

103. Output the target media content.

After the target media content is determined based on the live streaming feature information, the target media content may be output by using the electronic device of the streamer, or the target media content may be output by using the electronic device of the viewer, or the target media content may be output by using a third-party device (for example, a smart sound box or a large screen television) at a live streaming site. It should be understood that if the target media content is text, an emoji, or an image, an output may be displayed by using an apparatus such as a display screen; if the target media content is voice or music, an output may be played by using a device such as a loudspeaker or a smart speaker; and if the target media content is a video, an output may be played by using a device such as a mobile phone or a large screen television.

In an implementation of the embodiments of the present application, the outputting the target media content includes:

outputting the target media content in the live streaming process.

After the corresponding target media content is generated in the foregoing manner, the target media content may be output in the live streaming process. In this way, when watching live streams, the viewer not only obtains regular live streaming information of the streamer, but also can receive additional target media content. Experience of using the target product by the streamer can be more intuitively felt by using the target media content, thereby significantly improving the sense of novelty and immersion of the viewer while watching live streams.

In another implementation of the embodiments of the present application, the outputting the target media content includes:

outputting the target media content after the live streaming process ends or after a delay time period confirmed by the streamer.

After the corresponding target media content is generated in the foregoing manner, the target media content may be output only after the live streaming process ends or after the delay time period (for example, after one hour or one day) confirmed by the streamer. In this way, the output target media content may be used as a prompt for the streamer to review the live streaming process, to make it convenient for the streamer to summarize a live streaming status and a live streaming effect. Alternatively, the streamer may notify the viewer of output time of the target media content, and the viewer may log in to the live streaming room to view the output target media content, which provides additional anticipation for the viewer after live streaming ends, thereby further improving entertainment experience.

In an implementation of the embodiments of the present application, after the outputting the target media content, the method further includes:

(1) determining a trend of change in tipping information from a viewer toward the streamer; and (2) adjusting the media content synthesis manner based on the trend of change.

To facilitate analysis and optimization of a media content synthesis manner of the target media content, the electronic device may continuously record data such as tipping information from the viewer toward the streamer in a latest period of time, the control parameter of the target product, and various parameters of the target media content. Through statistical analysis on these data, it is possible to determine the trend of change in the tipping information of the viewer for the streamer, and appropriately adjust a media content synthesis manner based on the trend of change. Specifically, if the viewer's tipping amount to the streamer continues to decrease, it indicates that the synthesized target media content cannot effectively enhance the sense of novelty and immersion of the viewer while watching live streams. In this case, the current media content synthesis manner needs to be adjusted. For example, a manner of synthesizing the target media content only based on the facial expression of the streamer is adjusted into a manner of synthesizing the target media content based on a combination of the facial expression of the streamer, the tipping information of the viewer, and the product control parameter. Otherwise, if the viewer's tipping amount to the streamer continues to increase, it indicates that the synthesized target media content can effectively enhance the sense of novelty and immersion of the viewer while watching live streams. In this case, the current media content synthesis manner is maintained. With this setting, the media content synthesis manner can be adjusted in time when the playback of the target voice cannot achieve an expected effect, which helps maintain the sense of novelty and immersion of the viewer while watching live streams.

Figure 2:
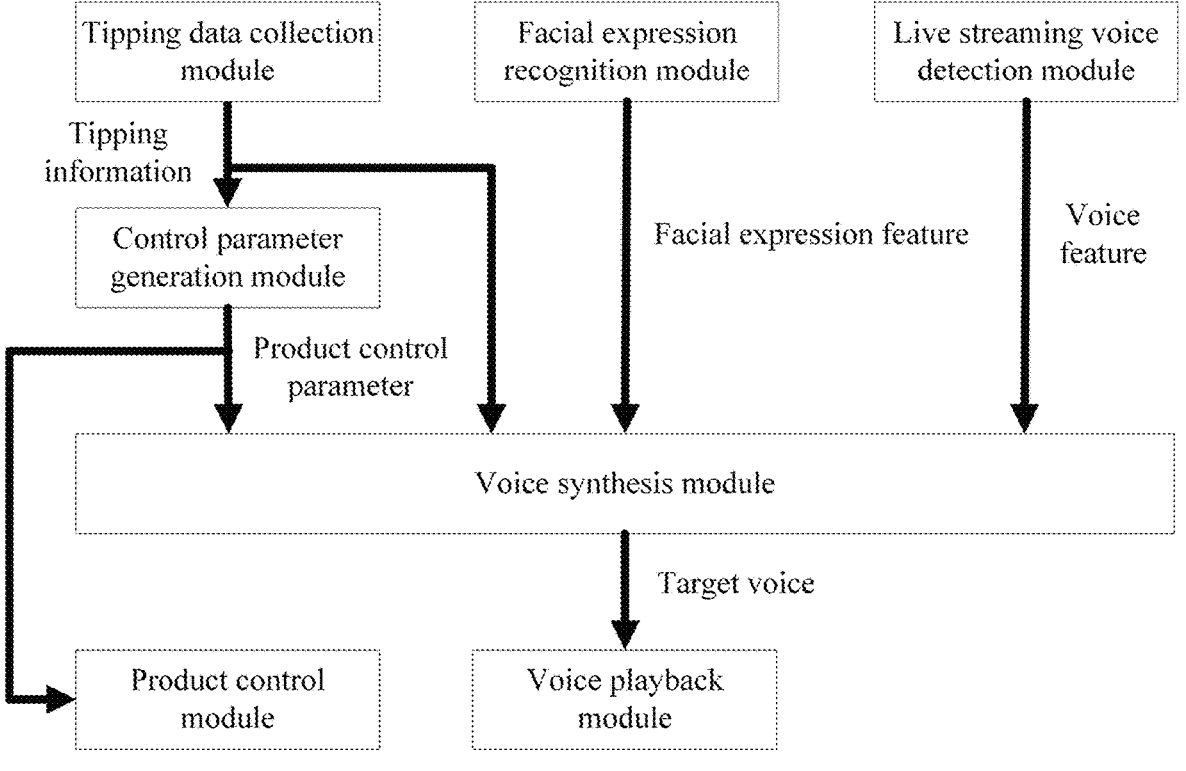
FIG. 2 is a diagram of a relationship between system functional modules in a method for outputting media content in live interaction according to embodiments of the present application.

As an example, FIG. 2 is a diagram of a relationship between system functional modules in a method for outputting media content in live interaction according to embodiments of the present application. The functional modules shown in FIG. 2 include a tipping data collection module, a control parameter generation module, a facial expression recognition module, a live streaming voice detection module, a voice synthesis module, a product control module, and a voice playback module. The tipping data collection module collects tipping information of a viewer; the control parameter generation module generates a product control parameter based on the tipping information; the facial expression recognition module detects a facial expression feature of a streamer; the live streaming voice detection module detects a voice feature of the streamer; the voice synthesis module synthesizes target voice based on the tipping information, the product control parameter, the facial expression feature, and the voice feature of the streamer; the product control module controls the target product based on the product control parameter; and the voice playback module plays the target voice.

For the technical solution in the embodiments of the present application, in the process in which the streamer performs live streaming by using the target product, the streamer obtains, by using an electronic device such as a mobile phone, the live streaming feature information used to determine the media content to be output, then determines the target media content based on the live streaming feature information, and finally outputs the target media content in a specified manner. For example, it is assumed that when the streamer performs live streaming by using a cervical massager, the mobile phone may be used to capture a facial image of the streamer and recognize a facial expression feature. The facial expression feature may be used as the live streaming feature information that determines the media content to be output. Then, corresponding target media content is generated based on the facial expression feature. For example, audio and/or text "The intensity feels very comfortable" is generated based on an expression indicating relax, and audio and/or text "The intensity is too strong" is generated based on an expression indicating pain. Finally, the generated audio can be played and/or the generated text can be displayed in the live streaming process. With this setting, when watching live streams, a viewer not only obtains regular live streaming information of the streamer, but also can receive additional target media content. By using the target media content, the viewer can more intuitively perceive experience of using the target product by the streamer, thereby significantly improving the sense of novelty and immersion of the viewer while watching live streams, to improve viewership of live streams and boost product sales.

It should be understood that sequence numbers of the steps in the foregoing embodiments do not mean execution sequences. The execution sequences of the procedures should be determined based on functions and internal logic of the procedures, and should not be construed as any limitation on the implementation procedures of the embodiments of the present application.

A method for outputting media content in live interaction is mainly described above, and an apparatus for outputting media content in live interaction is to be described below.

Figure 3:
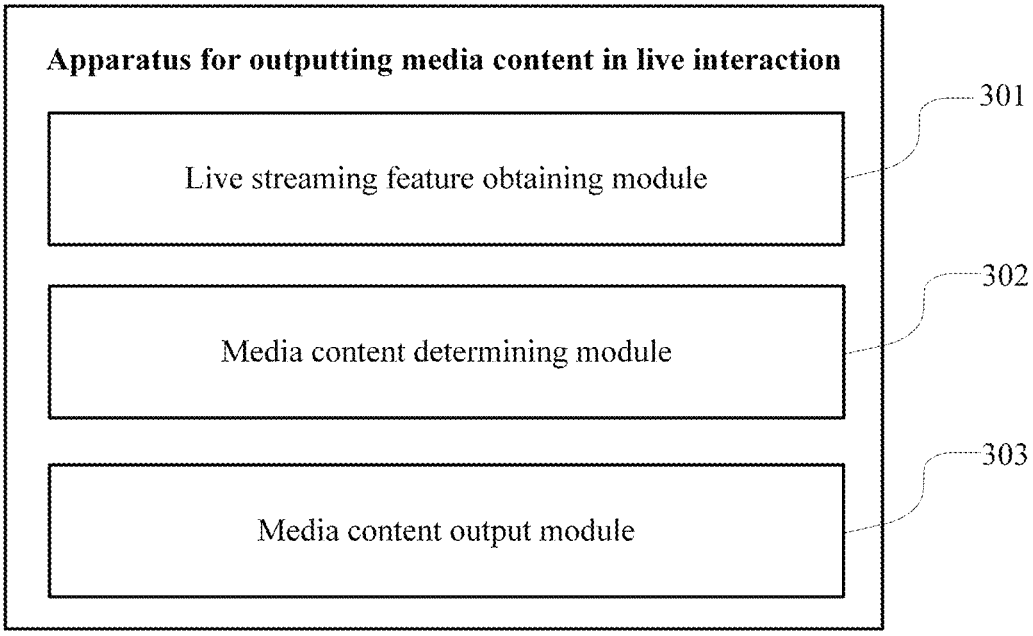
FIG. 3 is a schematic structural diagram of an apparatus for outputting media content in live interaction according to embodiments of the present application.

FIG. 3 shows an apparatus for outputting media content in live interaction according to embodiments of the present application. The media content output apparatus includes:

a live streaming feature obtaining module 301, configured to: in a process in which a streamer performs live streaming by using a target product, obtain live streaming feature information used to determine media content to be output;

a media content determining module 302, configured to determine target media content based on the live streaming feature information; and a media content output module 303, configured to output the target media content.

In an implementation of the embodiments of the present application, the live streaming feature obtaining module includes:

a real-time facial image obtaining unit, configured to obtain a real-time facial image of the streamer;

a facial expression feature recognition unit, configured to recognize a facial expression feature of the streamer based on the real-time facial image; and a first live streaming feature determining unit, configured to determine the facial expression feature as the live streaming feature information.

In an implementation of the embodiments of the present application, the live streaming feature obtaining module includes:

a real-time voice signal obtaining unit, configured to obtain a live voice signal of the streamer;

an audio emotion feature recognition unit, configured to recognize an audio emotion feature of the streamer based on the real-time voice signal; and a second live streaming feature determining unit, configured to determine the audio emotion feature as the live streaming feature information.

In an implementation of the embodiments of the present application, the live streaming feature obtaining module includes:

an operation action detection unit, configured to detect an operation action of the streamer;

a command/emotion identification unit, configured to recognize a trigger command and/or an emotion cue of the streamer based on the operation action; and a third live streaming feature determining unit, configured to determine the trigger command and/or the emotion cue as the live streaming feature information.

In an implementation of the embodiments of the present application, the live streaming feature obtaining module includes:

a physiological status signal obtaining unit, configured to obtain a physiological status signal of the streamer;

an emotional state recognition unit, configured to recognize an emotional state of the streamer based on the physiological status signal; and a fourth live streaming feature determining unit, configured to determine the emotional state as the live streaming feature information.

In an implementation of the embodiments of the present application, the live streaming feature obtaining module includes:

a text content obtaining unit, configured to obtain text content involved in the live streaming process;

a text emotion feature determining unit, configured to determine a text emotion feature based on the text content; and a fifth live streaming feature determining unit, configured to determine the text emotion feature as the live streaming feature information.

In an implementation of the embodiments of the present application, the live streaming feature obtaining module includes:

a real-time lip-shape image obtaining unit, configured to obtain a real-time lip-shape image of the streamer;

an intended-to-speak text determining unit, configured to perform visual speech recognition on the real-time lip-shape image to determine an intended-to-speak text of the streamer; and a sixth live streaming feature determining unit, configured to determine the intended-to-speak text as the live streaming feature information.

In an implementation of the embodiments of the present application, the live streaming feature obtaining module includes:

a viewer feedback information obtaining unit, configured to obtain real-time feedback information provided by a viewer for the streamer; and a seventh live streaming feature determining unit, configured to determine the real-time feedback information as the live streaming feature information.

In an implementation of the embodiments of the present application, the live streaming feature obtaining module includes:

a modality signal obtaining unit, configured to obtain a modality signal of the streamer, where the modality signal includes at least one of a real-time facial image, a real-time voice signal, a text input signal, or a gesture signal; and an eighth live streaming feature determining unit, configured to determine the modality signal as the live streaming feature information.

In an implementation of the embodiments of the present application, the live streaming feature obtaining module includes:

an environment feature information identification unit, configured to recognize environment feature information of an environment in which the streamer is located; and a ninth live streaming feature determining unit, configured to determine the environment feature information as the live streaming feature information.

In an implementation of the embodiments of the present application, the media content determining module includes:

a media content synthesizing unit, configured to synthesize the target media content based on the live streaming feature information in a preset media content synthesis manner.

In an implementation of the embodiments of the present application, the media content synthesizing unit includes:

a voice synthesizing subunit, configured to synthesize target voice as the target media content based on the live streaming feature information in a preset voice synthesis manner;

a music synthesizing subunit, configured to synthesize target music as the target media content based on the live streaming feature information configured in a preset music synthesis manner;

an animation synthesizing subunit, configured to synthesize a target animation as the target media content based on the live streaming feature information configured in a preset animation synthesis manner; and an image synthesizing subunit, configured to synthesize a target image as the target media content based on the live streaming feature information in a preset image synthesis manner.

In an implementation of the embodiments of the present application, the apparatus for outputting media content in live interaction further includes:

a tipping trend determining module, configured to determine a trend of change in tipping information from a viewer toward the streamer; and a synthesis manner adjusting module, configured adjust the media content synthesis manner based on the trend of change.

In an implementation of the embodiments of the present application, the media content determining module includes:

a media content searching unit, configured to search a pre-created media content library for at least one media content associated with the live streaming feature information; and a media content determining unit, configured to determine the at least one media content as the target media content.

In an implementation of the embodiments of the present application, the media content output module includes:

a live streaming output unit, configured to output the target media content in the live streaming process; and a delay output unit, configured to output the target media content after the live streaming process ends or after a delay time period confirmed by the streamer.

In an implementation of the embodiments of the present application, the apparatus for outputting media content in live interaction further includes:

an interaction data obtaining module, configured to obtain interaction data between the viewer and the streamer, where the interaction data includes at least one of tipping information, comment information, or liking information;

a quantity of participants determining module, configured to determine a quantity of participants corresponding to the interaction data, where the quantity of participants includes at least one of a quantity of viewers who tip, a quantity of viewers who post comments, or a quantity of viewers who give likes;

a weight allocation determining module, configured to determine a corresponding weight allocation of the interaction data based on the quantity of participants; and a first product control module, configured to control the target product based on the interaction data and the weight allocation of the interaction data.

In an implementation of the embodiments of the present application, the apparatus for outputting media content in live interaction further includes:

a tipping information obtaining module, configured to obtain the tipping information from the viewer toward the streamer;

a control parameter generation module, configured to generate a target control parameter of the target product based on the tipping information; and a second product control module, configured to control the target product based on the target control parameter.

In an implementation of the embodiments of the present application, the tipping information includes a tipping amount, and the control parameter generation module includes:

an amount tier determining unit, configured to determine a target amount tier in which the tipping amount falls; and a control parameter searching unit, configured to search, based on a preset mapping relationship, for a control parameter corresponding to the target amount tier as the target control parameter, where the preset mapping relationship records a control parameter corresponding to each amount tier.

Embodiments of the present application further provide a computer-readable storage medium. The computer-readable storage medium stores a computer program, and when the computer program is executed by a processor, the method for outputting media content in live interaction described in any one of the foregoing embodiments is implemented.

Embodiments of the present application further provide a computer program product. When the computer program product runs on an electronic device, the electronic device is enabled to perform the method for outputting media content in live interaction described in any one of the foregoing embodiments.

Figure 4:
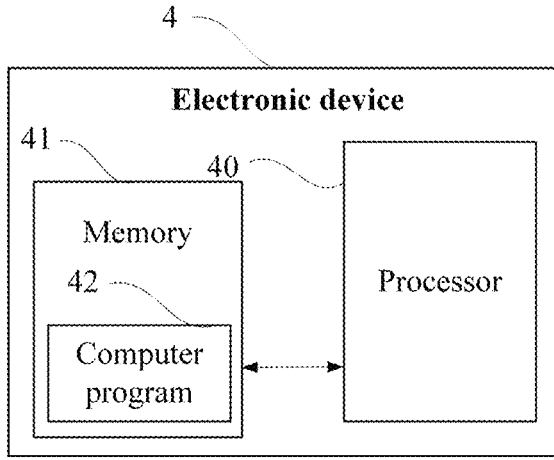
FIG. 4 is a schematic diagram of an electronic device according to embodiments of the present application.

FIG. 4 is a schematic diagram of an electronic device according to embodiments of the present application. As shown in FIG. 4, an electronic device 4 in the embodiments includes a processor 40, a memory 41, and a computer program 42 stored in the memory 41 and capable of running on the processor 40. When executing the computer program 42, the processor 40 implements the steps in the foregoing embodiments of the method for outputting media content in live interaction, for example, step 101 to step 103 shown in FIG. 1. Alternatively, when executing the computer program 42, the processor 40 implements functions of the modules/units in the foregoing apparatus embodiments, for example, implements functions of the module 301 to the module 303 of the apparatus shown in FIG. 3.

The computer program 42 may be divided into one or more modules/units, and the one or more modules/units are stored in the memory 41 and executed by the processor 40 to complete the present application. The one or more modules/units may be a series of computer program instruction segments capable of completing a specific function, and the instruction segment is used to describe an execution process of the computer program 42 in the electronic device 4.

The processor 40 may be a central processing unit (Central Processing Unit, CPU), or may be another general-purpose processor, a digital signal processor (Digital Signal Processor, DSP), an application-specific integrated circuit (Application Specific Integrated Circuit, ASIC), a field pro-grammable gate array (Field Programmable Gate Array) FPGA) or another programmable logic device, a discrete gate or a transistor logic device, a hardware component, or the like. The general-purpose processor may be a micropro-cessor, or the processor may be any conventional processor or the like.

The memory 41 may be an internal storage unit of the electronic device 4, for example, a hard disk or a storage of the electronic device 4. The memory 41 may alternatively be an external storage device of the electronic device 4, for example, a plug-in hard disk, a smart media card (Smart Media Card, SMC), a secure digital (Secure Digital, SD) card, or a flash card (Flash Card) that is configured on the electronic device 4. Further, the memory 41 may alterna-tively include both an internal storage unit and an external storage device of the electronic device 4. The memory 41 is configured to store the computer program and other pro-grams and data required by the electronic device. The memory 41 may further be configured to temporarily store data that has been output or that is to be output.

Persons skilled in the art may clearly understand that, for ease and brevity of description, division of the foregoing functional units and modules is merely used as an example for description. In an actual application, the foregoing functions may be allocated to different functional units and modules based on a requirement, that is, an internal structure of the apparatus is divided into different functional units or modules, to complete all or some of the functions described above. The functional units or modules in the embodiments may be integrated into one processing unit, each unit may exist alone physically, or two or more units are integrated into one unit. The foregoing integrated unit may be imple-mented in a form of hardware, or may be implemented in a form of a software functional unit. In addition, specific names of the functional units and modules are also used for ease of mutual distinction, and are not used to limit the protection scope of the present application. For a specific working process of each of the units and the modules in the foregoing system, reference may be made to a corresponding process in the foregoing method embodiments. Details are not described herein again.

It can be clearly understood by persons skilled in the art that for convenience and brevity of description, for specific working processes of the described system, apparatus, and unit, reference may be made to the corresponding processes in the foregoing method embodiments. Details are not repeated herein.

In the foregoing embodiments, the descriptions of the embodiments have respective focuses. For a part that is not detailed or described in an embodiment, reference may be made to related descriptions in other embodiments.

Persons of ordinary skill in the art may be aware that the units and the algorithm steps in the examples described with reference to the embodiments disclosed in this specification can be implemented by using electronic hardware or a combination of computer software and electronic hardware. Whether these functions are performed by hardware or software depends on specific applications and design constraints of the technical solutions. Persons skilled in the art may use different methods to implement the described functions for each specific application, but it should not be considered that the implementation goes beyond the scope the present application.

In the embodiments provided in the present application, it should be understood that the disclosed apparatus and method may be implemented in another manner. For example, the described system embodiment is merely an example. For example, division of the modules or units is merely logical function division. In actual implementation, there may be another division manner. For example, a plurality of units or components may be combined or integrated into another system, or some features may be ignored or not performed. In addition, the displayed or discussed mutual coupling, direct coupling, or communication connection may be implemented through some interfaces, and indirect coupling or a communication connection of the apparatuses or units may be in an electrical, mechanical, or another form.

The units described as separate components may or may not be physically separated, and components displayed as units may or may not be physical units, in other words, may be located in one place, or may be distributed on a plurality of network units. Some or all of the modules may be selected based on actual requirements to achieve the objectives of the solutions in the embodiments.

In addition, the functional units in embodiments of the present application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on this understanding, all or some of the processes in the methods of the foregoing embodiments may be implemented by a computer program instructing relevant hardware in the present application. The computer program may be stored in a computer-readable storage medium. When the computer program is executed by a processor, the steps in the foregoing method embodiments may be implemented. The computer program includes computer program code, and the computer program code may be in a source code form, an object code form, an executable file, some intermediate forms, or the like. The computer-readable medium may include: any entity or apparatus that can carry the computer program code, a recording medium, a USB flash drive, a removable hard disk, a magnetic disk, a compact disc, a computer memory, a read-only memory (ROM, Read-Only Memory), a random access memory (RAM, Random Access Memory), an electrical carrier signal, a telecommunication signal, a software distribution medium, or the like. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunication signal.

The foregoing embodiments are merely used to describe the technical solutions of the present application, instead of limiting the technical solutions of the present application. Although the present application is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the spirit and scope of the technical solutions in the embodiments of the present application, and shall fall within the protection scope of the present application.

The invention claimed is:

1. A method for outputting media content in live interaction, comprising:
   in a process in which a streamer performs live streaming by using a target product, obtaining live streaming feature information used to determine media content to be output;
   determining target media content based on the live streaming feature information;
   synthesizing the target media content based on the live streaming feature information in a preset media content synthesis manner;
   obtaining interaction data between the viewer and the streamer, wherein the interaction data comprises tipping information;
   determining a quantity of participants corresponding to the interaction data, wherein the quantity of participants comprises a quantity of viewers who tip;
   determining a corresponding weight allocation of the interaction data based on the quantity of participants;
   controlling the target product based on the interaction data and the weight allocation of the interaction data; and
   outputting the target media content;
   wherein after the outputting the target media content determining a trend of change in tipping information from a viewer toward the streamer;
   adjusting the media content synthesis manner based on the trend of change.

2. The method according to claim 1, wherein the obtaining live streaming feature information used to determine media content to be output comprises:
   obtaining a real-time facial image of the streamer;
   recognizing a facial expression feature of the streamer based on the real-time facial image; and
   determining the facial expression feature as the live streaming feature information.

3. The method according to claim 1, wherein the obtaining live streaming feature information used to determine media content to be output comprises:
   obtaining a real-time voice signal of the streamer;
   recognizing an audio emotion feature of the streamer based on the real-time voice signal; and
   determining the audio emotion feature as the live streaming feature information.

4. The method according to claim 1, wherein the obtaining live streaming feature information used to determine media content to be output comprises:
   detecting an operation action of the streamer;
   recognizing a trigger command and/or an emotion cue of the streamer based on the operation action; and
   determining the trigger command and/or the emotion cue as the live streaming feature information.

5. The method according to claim 1, wherein the obtaining live streaming feature information used to determine media content to be output comprises:
   obtaining a physiological status signal of the streamer;
   recognizing an emotional state of the streamer based on the physiological status signal; and determining the emotional state as the live streaming feature information.

6. The method according to claim 1, wherein the obtaining live streaming feature information used to determine media content to be output comprises:

obtaining text content involved in the live streaming process;

determining a text emotion feature based on the text content; and determining the text emotion feature as the live streaming feature information.

7. The method according to claim 1, wherein the obtaining live streaming feature information used to determine media content to be output comprises:

obtaining a real-time lip-shape image of the streamer;

performing visual speech recognition on the real-time lip-shape image to determine an intended-to-speak text of the streamer; and determining the intended-to-speak text as the live streaming feature information.

8. The method according to claim 1, wherein the obtaining live streaming feature information used to determine media content to be output comprises:

obtaining real-time feedback information provided by a viewer for the streamer; and determining the real-time feedback information as the live streaming feature information.

9. The method according to claim 1, wherein the obtaining live streaming feature information used to determine media content to be output comprises:

obtaining a modality signal of the streamer, wherein the modality signal comprises at least one of a real-time facial image, a real-time voice signal, a text input signal, or a gesture signal; and determining the modality signal as the live streaming feature information.

10. The method according to claim 1, wherein the obtaining live streaming feature information used to determine media content to be output comprises:

recognizing environment feature information of an environment in which the streamer is located; and determining the environment feature information as the live streaming feature information.

11. The method according to claim 1, wherein the synthesizing the target media content based on the live streaming feature information in a preset media content synthesis manner comprises:

synthesizing target voice as the target media content based on the live streaming feature information in a preset voice synthesis manner; or synthesizing target music as the target media content based on the live streaming feature information in a preset music synthesis manner; or synthesizing a target animation as the target media content based on the live streaming feature information in a preset animation synthesis manner; or synthesizing a target image as the target media content based on the live streaming feature information in a preset image synthesis manner.

12. The method according to claim 1, wherein the determining target media content based on the live streaming feature information comprises:

searching a pre-created media content library for at least one media content associated with the live streaming feature information; and determining the at least one media content as the target media content.

13. The method according to claim 1, wherein the outputting the target media content comprises:

outputting the target media content in the live streaming process; or outputting the target media content after the live streaming process ends or after a delay time period confirmed by the streamer.

14. The method according to claim 1, wherein the method further comprises:

obtaining the tipping information from the viewer toward the streamer;

generating a target control parameter of the target product based on the tipping information; and controlling the target product based on the target control parameter.

15. The method according to claim 14, wherein the tipping information comprises a tipping amount, and the generating a target control parameter of the target product based on the tipping information comprises:

determining a target amount tier in which the tipping amount falls; and searching, based on a preset mapping relationship, for a control parameter corresponding to the target amount tier as the target control parameter, wherein the preset mapping relationship records a control parameter corresponding to each amount tier.

16. An electronic device, comprising a memory, a processor, and a computer program stored in the memory and capable of running on the processor, wherein when the processor executes the computer program, the method for outputting media content in live interaction according to claim 1 is implemented.

17. A non-transitory computer readable medium storing a computer program product, wherein when the computer program product runs on an electronic device, the electronic device is enabled to perform the method for outputting media content in live interaction according to claim 1.

* * * * *